Sept. 16, 1924.  
H. G. PFAEHLER ET AL  
COOKING UTENSIL  
Filed April 18, 1924  
1,508,817

INVENTORS  
H.G. Pfaehler & C.J. Marks  
BY  
T. F. Bourne  
ATTORNEY

Patented Sept. 16, 1924.

1,508,817

UNITED STATES PATENT OFFICE.

HERMAN G. PFAEHLER, OF NEW YORK, N. Y., AND CHARLES J. MARKS, OF PATERSON, NEW JERSEY.

COOKING UTENSIL.

Application filed April 18, 1924. Serial No. 707,344.

*To all whom it may concern:*

Be it known that we, HERMAN G. PFAEHLER, a citizen of the United States, and resident of New York city, borough of Manhattan, county and State of New York, and CHARLES J. MARKS, a citizen of the United States, and resident of Paterson, county of Passaic, State of New Jersey, have invented certain new and useful improvements in Cooking Utensils, of which the following is a specification.

In United States Letters Patent No. 1,106,837, granted to us August 11, 1914, for cooking utensils, wherein a vessel is provided with a lid and a yoke having resilient means for retaining the lid upon the vessel, a valve is provided to release steam pressure from within the kettle. The pressure within the kettle was controlled by the weight of the valve and a spring pressing thereon, and there was no variation either in the pressure of the lid upon the kettle or of the weight of the valve against its seat.

Our present invention relates to improvements in the class of cooking utensils referred to and has for its object to provide means to control the pressure of the lid upon the kettle as well as to control the resistance of the valve to pressure within the kettle.

In accordance with our invention food may be cooked with relatively light or normal steam pressure within the kettle, or with increased steam pressure within the kettle which may be caused by increasing the resistance of the escape valve as well as by increasing the pressure of the lid upon the kettle.

Our invention comprises novel details of improvement that will be more fully hereinafter set forth and then pointed out in the claims.

Reference is to be had to the acompanying drawings forming a part hereof, wherein—

Figure 1:
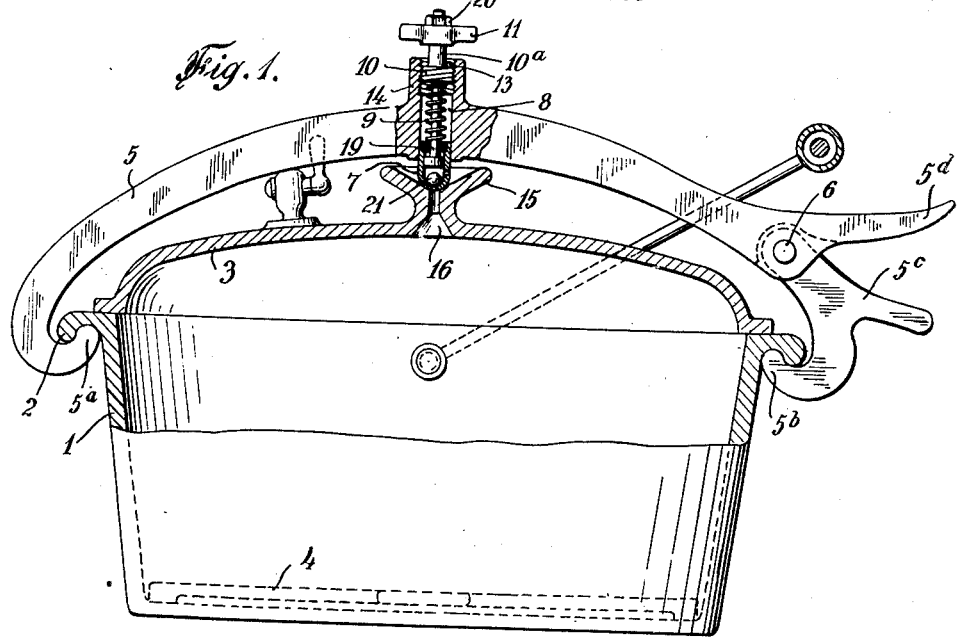
Figure 2:
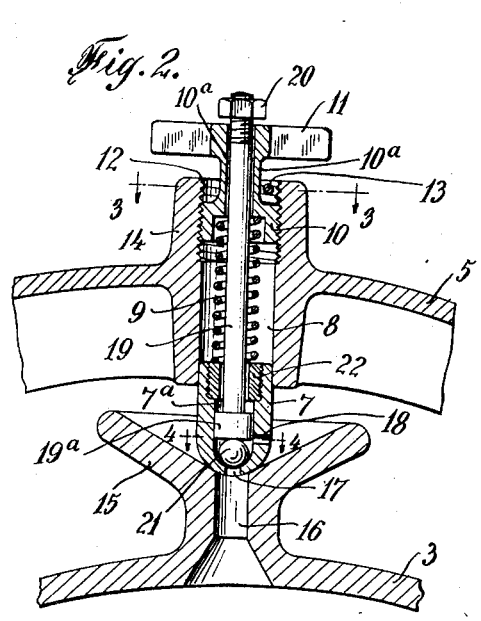
Figure 3:
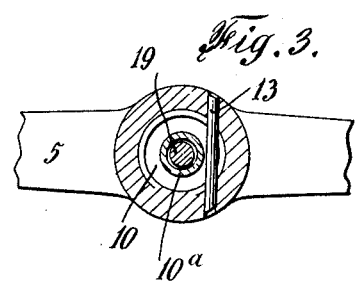
Figure 4:
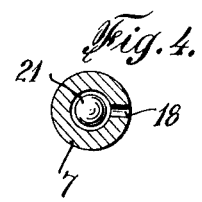

Fig. 1 is a partly sectional side elevation of a cooking utensil embodying our invention;

Fig. 2 is an enlarged detail section of part of Fig. 1, showing parts in a different position; and Figs. 3 and 4 are cross sections, respectively on lines 3, 3, and 4, 4, in Fig. 2.

Similar numerals of reference indicate corresponding parts in the several views.

At 1 is indicated a kettle or pot which may be of any suitable construction, preferably of cast metal to retain the heat, and shown provided with an outer overhanging or hook-like flange or extension 2 adjacent to its upper edge. At 3 is a lid or cover to fit on said edge. By preference the meeting edges of the kettle and lid are in the form of ground joints to form a tight closure without requiring packing. A suitable grate 4 may be provided to rest upon the bottom of the kettle. A yoke 5 is adapted to extend over the lid and is shown provided with hook-like ends 5ª, 5ᵇ to engage the flange 2 to retain the yoke in position over the lid. The yoke is shown provided with a movable finger piece 5ᶜ having the end 5ᵇ to engage flange 2 and pivotally connected with the yoke at 6. An extension 5ᵈ over the finger piece enables the ready operation of the finger piece by pressing upon the extension. The foregoing parts are substantially the same as set forth in our aforesaid Letters Patent.

A spring pressed plunger 7 is slidably guided in a bore 8 in the yoke located in position to be substantially central with the yoke over the lid. Said plunger is normally pressed toward the lid by spring 9 within bore 8, the lower end of which spring is shown pressing aginst the plunger and the outer end of the spring bears against an adjustable member 10, shown in the form of a nut, having an extension 10ª provided with projections at 11, in the form of a wing-nut, for convenience in rotating the member or nut. The threads on the member cooperate within internal threads 12 at the outer end of bore 8, and a stop 13, shown in the form of a pin located transversely in the projecting portion 14 of the yoke, opposes the member 10 to limit its outward movement. When the member 10 is located at the outer portion of bore 8, as against the stop 13, the pressure of spring 9 upon plunger 7, hence upon lid 3, will be normal or relatively light, and when the member 10 is screwed into bore 8 the pressure of the spring upon the plunger and thus upon the lid will be increased.

The plunger 7 is adapted to fit within a centrally disposed recessed knob or finger piece 15 on lid 3 which has an outlet passage 16 leading therethrough and through the lid to register with a port 17 that communicates with central bore 7ª in plunger 7, said plunger being provided with a lateral port 18 communicating with bore 7ª, to permit the outflow of vapor or steam from the kettle. At 19 is a rod shown slidable in bores 7ª and 8 and in a bore 10ª in member 10, the upper end of said rod extending beyond said member. At its outer end beyond member 10 the rod is provided with a stop at 20, shown in the form of a nut, the lower end of the rod being adapted, under some conditions, to rest upon a ball valve 21 located at the bottom of bore 7ª of plunger 7 to normally close the outlet from the kettle through port 17. The plunger is shown provided with a stop 22, shown in the form of a nut, having a bore receiving rod 19 and secured by threads at the upper end of bore 7ª of the plunger. The spring 9 rests upon the nut 22 and the lower or inner end of rod 19 is provided with a head or enlargement 19ª, between valve 21 and nut 22, so that the head 19ª may move freely within bore 7ª between nut 22 and the valve. The rod 19 will retain plunger 7 within bore 8.

The arrangement of the parts is such that when member 10 is raised, as in Fig. 1, it will engage the stop or nut 20 on rod 19 and raise the latter away from valve 21, in which position of the parts the plunger 7 is pressed against the lid by the light or normal pressure of spring 9, and valve 21 will be free from the rod and will control the pressure of steam or vapor within the kettle according to the weight of said valve. The spring 9 also by pushing upon plunger 7 retains the lid 3 upon the kettle with normal pressure. When it is desired to increase the steam pressure within the kettle beyond the normal pressure maintained by valve 21 the member 10 is screwed into the bore 8 to increase the pressure of spring 9 against the lid, and the rod 19 will be correspondingly lowered, whereupon when member 10 is entered in bore 8 sufficiently far the rod 19 will rest upon valve 21 and the weight of the rod will be superimposed upon the valve when the member 10 moves away from nut 20, as illustrated in Fig. 2. The effect of such adjustment of member 10 is not only to increase the pressure of spring 9 upon the lid but to load and increase the resistance of valve 21, to cause increased vapor or steam pressure within the kettle due to the weight of rod 19 and its parts. By this means a variation of the pressure within the kettle may be made between the two extremes of the unloaded valve 21 and the valve when loaded by the superimposed weight of rod 19.

Having now described our invention what we claim is:—

1. A vessel provided with a lid having an outlet passage, a yoke, and means for detachably securing the yoke to the vessel over the lid, said yoke having a bore, a plunger slidable in the bore, the plunger having a valve to control the flow from said passage, a spring normally pressing the plunger toward the lid, and means carried by the yoke operative against the spring independent of the plunger to vary the tension of the spring upon the plunger.

2. A vessel provided with a lid having an outlet passage, a yoke, and means for detachably securing the yoke to the vessel over the lid, said yoke having a bore, a plunger slidable in the bore, the plunger having a valve to control the flow from said passage, a spring normally pressing the plunger toward the lid, means carried by the yoke to vary the tension of the spring upon the plunger, and means cooperative with the valve to load the said valve, the first named means cooperating with the second named means to remove the said second named means from the valve.

3. A vessel provided with a lid having an outlet passage, a yoke, and means for detachably securing the yoke to the vessel over the lid, said yoke having a bore, a plunger slidable in the bore, the plunger having a valve to control the flow from said passage, a spring normally pressing the plunger toward the lid, means carried by the yoke to vary the tension of the spring upon the plunger, and a rod slidable relatively to the valve to load the latter and having means cooperative with the first named means to remove the rod from the valve.

4. A vessel provided with a lid having an outlet passage, a yoke, and means for detachably securing the yoke to the vessel over the lid, said yoke having a bore, a plunger slidable in the bore, the plunger having a valve to control the flow from said passage, a spring normally pressing the plunger toward the lid, means carried by the yoke to vary the tension of the spring upon the plunger, a rod slidable relatively to the valve to load the latter, and a stop on the rod outside said means in position to be engaged by the latter to remove the rod from the valve when said means is at one position, said means releasing the rod to permit it to load the valve when said means is in another position.

5. A vessel provided with a lid having an outlet passage, a yoke, and means for detachably securing the yoke to the vessel over the lid, said yoke having a bore, a plunger slidable in the bore, the plunger having a valve to control the flow from said passage, a spring normally pressing the plunger toward the lid, a member operatively connected with the yoke and cooperative with the spring to vary its tension, and a rod slidable relatively to the plunger and member and cooperative with the valve for weighting the said valve when the member is in one position relative to the plunger, said rod having means cooperative with said member for retaining the rod out of engagement with the valve when the member is in another position.

6. A vessel provided with a lid having an outlet passage, a yoke, and means for detachably securing the yoke to the vessel over the lid, said yoke having a bore, a plunger slidable in the bore, the plunger having a valve to control the flow from said passage, a member operatively connected with the yoke and movable toward and from the plunger, a spring operative between said member and plunger, said member and plunger having bores, and a rod slidable in said bores and adapted to cooperate with said valve to load it, said rod having a stop cooperative with said member in position to be engaged by the member to remove the rod from the valve when the member is in one position and to be released from the member when the latter is in another position to permit the rod to load the valve.

7. A vessel as set forth in claim 6, in which the plunger has a stop and the rod has a head to cooperate with the stop.

8. A vessel as set forth in claim 6, in which the yoke is provided with a stop to limit the outward movement of the member.

9. A vessel provided with a lid having an outlet passage, a yoke, and means for detachably securing the yoke to the vessel over the lid, said yoke having a bore, a plunger slidable in the bore, the plunger having a valve to control the flow from said passage, a spring normally pressing the plunger toward the lid, and means cooperative with the valve independent of the plunger to load the said valve.

Signed at New York, county of New York and State of New York this 17th day of April, 1924, and at Paterson, N. J., this 15th day of April, 1924.

HERMAN G. PFAEHLER.
CHARLES J. MARKS.